US009235212B2

(12) United States Patent
Bruemmer et al.

(10) Patent No.: US 9,235,212 B2
(45) Date of Patent: Jan. 12, 2016

(54) CONFLICT RESOLUTION BASED ON OBJECT BEHAVIORAL DETERMINATION AND COLLABORATIVE RELATIVE POSITIONING

(71) Applicants: David J. Bruemmer, Carlsbad, CA (US); Benjamin C. Hardin, Vista, CA (US); Curtis W. Nielsen, Carlsbad, CA (US)

(72) Inventors: David J. Bruemmer, Carlsbad, CA (US); Benjamin C. Hardin, Vista, CA (US); Curtis W. Nielsen, Carlsbad, CA (US)

(73) Assignee: 5D Robotics, Inc., Carlsbad, CA (US)

( * ) Notice: Subject to any disclaimer, the term of this patent is extended or adjusted under 35 U.S.C. 154(b) by 291 days.

(21) Appl. No.: 13/873,620

(22) Filed: Apr. 30, 2013

(65) Prior Publication Data
US 2014/0052293 A1    Feb. 20, 2014

Related U.S. Application Data

(60) Provisional application No. 61/641,201, filed on May 1, 2012, provisional application No. 61/652,347, filed on May 29, 2012, provisional application No. 61/773,063, filed on Mar. 5, 2013.

(51) Int. Cl.
*G05D 1/00* (2006.01)
*G01C 21/00* (2006.01)
*G05D 1/02* (2006.01)

(52) U.S. Cl.
CPC .............. *G05D 1/0088* (2013.01); *G01C 21/00* (2013.01); *G05D 1/0289* (2013.01); *G05D 1/024* (2013.01); *G05D 1/0261* (2013.01); *G05D 1/0274* (2013.01); *G05D 1/0278* (2013.01); *G05D 2201/0213* (2013.01)

(58) Field of Classification Search
CPC ... B60W 30/08; B05D 1/0274; G05D 1/0274; G05D 1/00
USPC .......................................................... 700/245
See application file for complete search history.

(56) References Cited

U.S. PATENT DOCUMENTS

| 6,922,632 | B2 * | 7/2005 | Foxlin ............................ 701/517 |
| 7,668,621 | B2 * | 2/2010 | Bruemmer ..................... 700/245 |
| 8,103,438 | B2 * | 1/2012 | Petrie et al. .................... 701/119 |
| 8,200,428 | B2 * | 6/2012 | Anderson ....................... 701/453 |
| 8,244,469 | B2 * | 8/2012 | Cheung et al. ................. 701/519 |
| 2003/0191568 | A1 | 10/2003 | Breed et al. |
| 2005/0060069 | A1 | 3/2005 | Breed et al. |
| 2008/0009970 | A1 | 1/2008 | Bruemmer et al. |
| 2008/0288162 | A1 * | 11/2008 | Theimer et al. ................ 701/117 |
| 2010/0198512 | A1 | 8/2010 | Zhang et al. |
| 2011/0046781 | A1 | 2/2011 | Summer |

FOREIGN PATENT DOCUMENTS

| EP | 2169503 A2 | 3/2010 |
| WO | 2004/015369 A2 | 2/2004 |
| WO | 2008/005663 A2 | 1/2008 |

* cited by examiner

*Primary Examiner* — Nicholas Kiswanto
(74) *Attorney, Agent, or Firm* — Martensen IP

(57) ABSTRACT

Using distributed positioning, collaborative behavioral determination, and probabilistic conflict resolution objects can independently identify and resolve potential conflicts before the occur. In one embodiment of the invention, interactive tags and other sensor resources associated with each of a plurality of objects provide among the objects relative positional data and state information. Using this information each object develops a spatial awareness of its environment, including the positional and action of nearby objects so as to, when necessary, modify its behavior to more effectively achieve an objective and resolve potential conflicts.

28 Claims, 9 Drawing Sheets

CONFLICT RESOLUTION BASED ON OBJECT BEHAVIORAL DETERMINATION AND COLLABORATIVE RELATIVE POSITIONING

RELATED APPLICATION

The present application relates to and claims the benefit of priority to U.S. Provisional Patent Application No. 61/641,201 filed 1 May 2012, U.S. Provisional Patent Application No. 61/652,347 filed 29 May 2012, and U.S. Provisional Patent Application No. 61/773,063 filed 5 Mar. 2013, all of which are hereby incorporated by reference in their entirety for all purposes as if fully set forth herein.

BACKGROUND OF THE INVENTION

1. Field of the Invention

Embodiments of the present invention relate, in general, to determining the relative position of an object and, more particularly, to probabilistic conflict determination and resolution using, among other things, ultra wide band identification tags.

2. Relevant Background

Sensor fusion is the combining of sensory data or data derived from sensory data from disparate sources such that the resulting information is, in some sense, better than would be possible when these sources were used individually. By comparison, data fusion is the process of integration of multiple data and knowledge representing the same object into a consistent, accurate, and useful representation. In each case, the overall goal is to provide more accurate, more complete, or more dependable/reliable result.

The data sources for a fusion process are not specified to originate from identical sensors. Indeed, one could argue that disparate data sources related to the same goal may provide a more accurate and more reliable product. While the fusion of multiple sensory data so as to provide "better" data is admirable, better data by itself is often inadequate. This is particularly true with respect to the behavioral use of spatial or positional data.

Understanding one's precise location has been a long quest throughout history. By possessing positional knowledge combined with an accurate map, one would think that many of the challenges from getting from point A to B would be resolved. Yet, despite the ubiquitous nature of GPS systems, people continue to get lost, traffic jams continue to occur, and collisions remain a threat. Indeed, one might argue that such systems have made the problems worse. Lacking in the prior art is a fusion of disparate positional determinative resources that provides a user with not only spatial but also relational information that can form the basis for a behavioral modification. Particularly lacking is a means to gain the ideal benefits of both absolute and relative positioning at the same time by appropriately combining multiple positioning techniques.

GPS is an example of absolute positioning and provides the benefit of supporting path planing, facilitating communication about positioning over large distances, and providing a persistent understanding of where things are in the world. Relative positioning has the benefit of being robust, more precise and does not require connection to an external source (i.e. satellite). Prior teachings have not provided a means to gain the benefits of both approaches simultaneously. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Presented hereafter by way of example is a system and its associated methodology for distributed positioning, collaborative behavioral determination, and probabilistic conflict resolution among a group of objects. In one embodiment of the invention, interactive tags are associated with each of a plurality of objects and/or locations that provide to each tag relative positional data and state information regarding the other nearby objects. Using this information, each object develops a spatial awareness of its environment, including the position and action of nearby objects so as to, when necessary, modify its behavior to more effectively achieve an objective and resolve potential conflicts.

One embodiment of the present invention includes a method for behavioral determination and conflict resolution by an object that comprises identifying a presence of one or more nearby objects and thereafter developing a local spatial awareness of an environment that includes these objects. The local spatial awareness (similar to a relational map) includes relative range, bearing and motion of each of the one or more nearby objects. The method continues by correlating the spatial awareness of the local environment with a primary course of action of each object and then determining whether one or more probabilistic conflicts exist between the local spatial awareness and the primary course of action(s). When conflicts exist, this embodiment of the present invention continues by modifying a behavior of an object or objects to, in one version, resolve or eliminate the conflict. The conflicts can include probabilistic collisions or actions that would prevent a mission objective from being achieved. Other conflicts can include the identification of non-correlated objects indicating that an object may not be authorized to be within a certain environment. Similarly, a conflict may indicate that one or more of the objects is within a certain range of another object or within a certain range of a known hazard.

Another embodiment of the present invention includes a system for behavioral determination and conflict resolution by an object comprising a detection module, a spatial awareness engine, a behavior engine and a guarded motion module. The detection module is operable to detect a presence of one or more nearby objects, while the spatial awareness engine creates a spatial representation of the plurality of nearby objects. In one version of the present invention, the spatial representation is object centric and provides relative positional and translational information about each of the one or more nearby objects. The guarded motion module is communicatively coupled to the spatial awareness engine and operable to identify one or more probabilistic conflicts. Lastly, the behavior engine communicates with the guarded motion module and, when necessary, is operable to modify object behavior in response to the identification of one or more probabilistic conflicts.

Another aspect of the present invention includes a method for behavioral determination and conflict resolution that begins by identifying a presence of one or more nearby objects and, thereafter, determining a relational location of each of the one or more nearby objects. The means by which to develop such a relational location is, according to one embodiment, dependent on the presence of sensing infrastructure such as positioning or detection modules placed at known locations.

In an embodiment in which infrastructure exists, positioning or detection modules are embedded into the environment and each are programmed to know their own spatial location based on, for example a GPS position or map coordinates. Other nearby objects may not know their precise geospatial location. However, as long as there are sufficient position modules or objects that do know their own location, these can be used to calculate the absolute position of the other nearby objects by reference to the known location of the position modules.

Each object at a known location (a position module or nearby module once it determines its position based on one or more position modules) is able to measure the distance to the other nearby objects. Some of these objects further include a data communication means that uses a non-line-of-sight transmission to share this distance data. According to one embodiment of the present invention, these objects can then broadcast distance measurements to the other objects including the unique identification of each object and the known position of the position modules.

Using triangulation (assuming multiple position modules) each object can thereafter compute the position of itself and the other nearby objects. By doing so, each object possesses its relative and absolute position. Moreover, each object can communicate to a central processor unique identification codes. In one embodiment of the present invention, the location of each identification code is correlated with the location of each detected object. The code is also compared to a list of authorized codes. In the instance in which the position of a detected object does not correlate with that of an authorized identification code, the present invention can identify the presence of a security or safety breach. The activity of the unauthorized object can be monitored and tracked and the behavior of the other objects modified based on the presence of an unknown entity.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
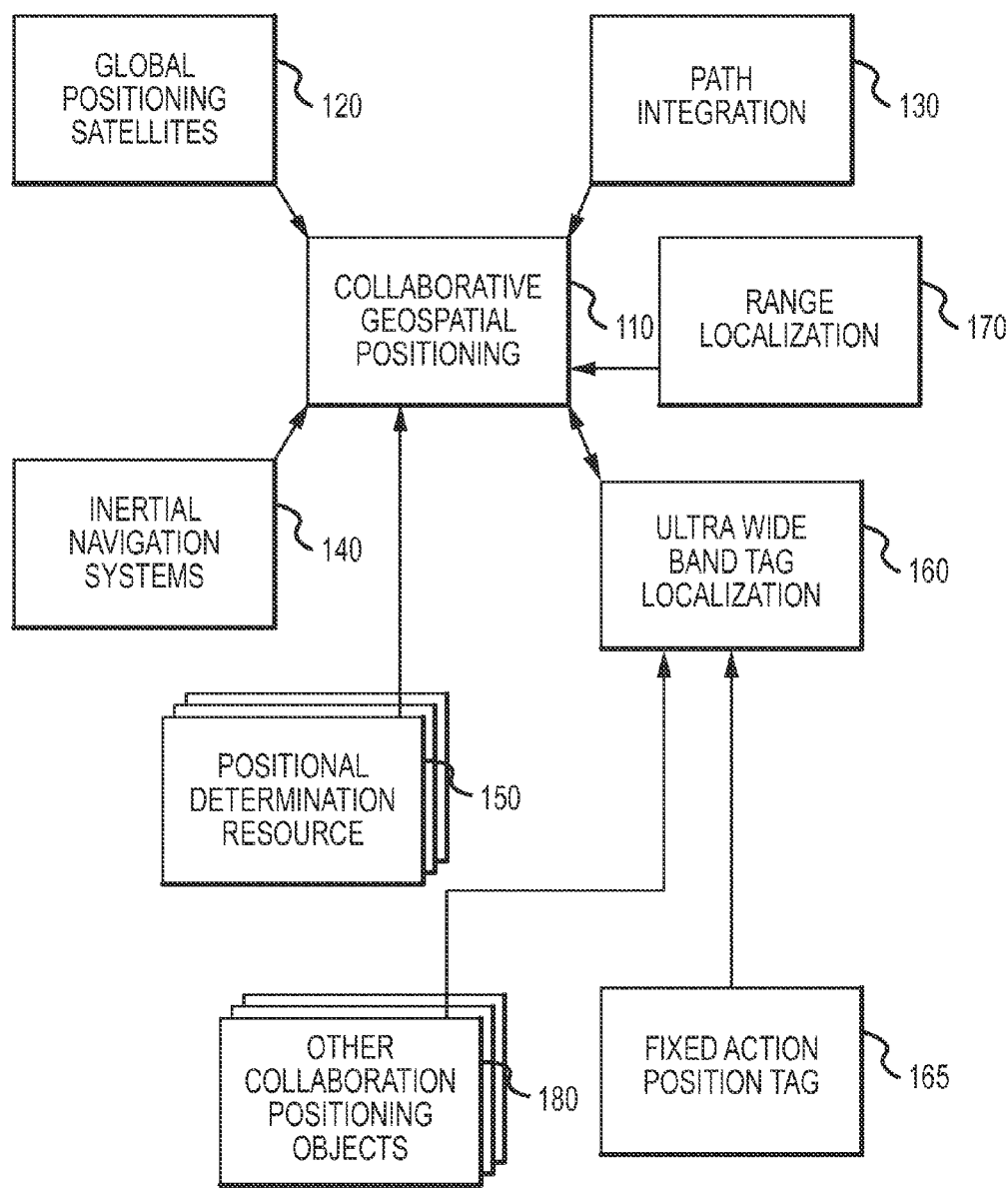
FIG. 1 presents a high level block diagram of a system for collaborative spatial positioning according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Disparate positional data derived from one or more positional determinative resources are fused with peer-to-peer relational data to provide an object with a collaborative positional awareness of its environment. According to one embodiment of the present invention, an object collects positional determinative information from one or more positional resources so as to independently determine its spatial location, as well as its relational position with respect to other nearby objects. Knowing the relative position and motion of nearby entities, an object thereafter determines whether any probabilistic conflicts exist. That is to say, whether if the current object maintains its current course of action, would that course of action conflict with those of the detected nearby objects. Should a conflict be recognized, the object's behavior can be modified to resolve (eliminate) that conflict. These and other applications of a system and associated methodology for conflict resolution based on object behavioral determination and collaborative relative positioning are possible and contemplated by one or more embodiments of the present invention.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

By the term "substantially," it is meant that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an," and "the" are intended to include the plural forms as well, unless the context clearly indicates otherwise. Thus, for example, reference to "a component surface" includes reference to one or more of such surfaces.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting," "mounted," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent," another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

According to one embodiment of the present invention, a collaborative positional determination approach provides accurate, reliable positioning, including a well-structured balance of positional data obtained from, for instance, Global Positioning System (GPS), laser-based localization, enhanced dead reckoning and an active tag (ranging) tracking technology that provides local area relative heading and distance. In one implementation of the present invention described above, GPS provides long range positioning and links the relative positioning to the global frame of reference, while laser localization permits a coherent local terrain understanding using a laser mapping strategy. Enhanced dead reckoning handles slippages and improves hazard detection by tracking minute movements of the robot over short intervals and tag tracking capability ensures a bound can be set on error (less than +/−6 inches) and allows a reactive, non-line-of-sight position capability. While the above example describes four means by which to gain positional data, one of reasonable skill in the relevant art will recognize that other positional determinative resources are equally applicable to the present invention and are indeed contemplated in their application and implementation. For example LIDaR (LIght Detection and Ranging or Laser Imaging Detection and Ranging) can be employed, as can vision detection systems, and the like.

A key advantage to the approach of the present invention is that it offers redundancy in the sense that each capability complements the others. One of the most immediate applications of the technology is to extend and enhance GPS in areas where GPS is unavailable or inaccurate so as to resolve potential conflicts between objects.

The conventional wisdom is that GPS can be used as the positioning solution, but sufficient error exists such that GPS cannot be used as the primary means to coordinate a variety of critical capabilities such as close quarters movement, multi-vehicle coordination, or the need for precise marking and manipulation. Even with differential GPS solutions, the system is not generally robust and reliable under tree cover, in bunkers, caves, buildings and many other situations. To better understand the limitations of GPS consider the following.

GPS is a locational and navigational system that allows users to pinpoint a place on the Earth with reasonable accuracy. The current GPS system makes use of signals transmitted by some of the 24 dedicated satellites circling the globe in precisely defined orbits. Using the satellites as reference points, GPS receivers calculate their positions based on the difference in arrival time of signals from the different satellites. Although GPS was initially developed for the U.S. military to guide missiles to targets, it is now routinely used for air traffic control systems, ships, trucks and cars, mechanized farming, search and rescue, tracking environmental changes, and more.

As mentioned above, GPS is a space-based satellite navigation system that provides location and time information in all weather, anywhere on or near the Earth, where there is an unobstructed line of sight to four or more GPS satellites. (In some cases a location determination can be made with three satellites.) The GPS program provides critical capabilities to military, civil and commercial users around the world and is the backbone for modernizing the global air traffic system, but it is not without its limitations.

To determine a location on the earth, a GPS receiver calculates its position by precisely timing the signals sent by GPS satellites high above the Earth. Each satellite continually transmits messages that include the time the message was transmitted and the satellite position at time of message transmission.

The receiver uses the messages it receives to determine the transit time of each message and computes the distance or range to each satellite. These distances, along with the satellites' locations, are used to compute the position of the receiver. A satellite's position and range define a sphere, centered on the satellite, with radius equal to the range. The position of the receiver is somewhere on the surface of this sphere. Thus, with four satellites, the indicated position of the GPS receiver is at or near the intersection of the surfaces of four spheres. In the ideal case of no errors, the GPS receiver would be at a precise intersection of the four surfaces.

One of the most significant error sources is the GPS receiver's clock. Because of the very large value of the speed of light, c, the estimated distances from the GPS receiver to the satellites, the range, are very sensitive to errors in the GPS receiver clock; for example an error of one microsecond (0.000001 second) corresponds to an error of 300 meters (980 ft). This suggests that an extremely accurate and expensive clock is required for the GPS receiver to work; however, manufacturers prefer to build inexpensive GPS receivers for mass markets. This dilemma is resolved by taking advantage of the fact that there are four ranges.

It is likely that the surfaces of the three spheres intersect, because the circle of intersection of the first two spheres is normally quite large, and thus, the third sphere surface is likely to intersect this large circle. If the clock is wrong, it is very unlikely that the surface of the sphere corresponding to the fourth satellite will initially intersect either of the two points of intersection of the first three, because any clock error could cause it to miss intersecting a point. On the other hand, if a solution has been found such that all four spherical surfaces at least approximately intersect with a small deviation from a perfect intersection, then it is quite likely that an accurate estimation of receiver position will have been found and that the clock is quite accurate.

The current GPS system is comprised of three segments; the space segment, the control segment and the user segment. The space segment (SS) is as one might imagine, composed of the orbiting GPS satellites. The orbits are centered on the Earth, not rotating with the Earth, but instead fixed with respect to the distant stars. The orbits are arranged so that at least six satellites are always within line of sight from almost everywhere on Earth's surface. The result of this objective is that the four satellites are not evenly spaced (90 degrees) apart within each orbit. In general terms, the angular difference between satellites in each orbit is 30, 105, 120, and 105 degrees apart, which, of course, sum to 360 degrees.

The control segment is composed of a master control station (MCS), an alternate master control station, four dedicated ground antennas, and six dedicated monitor stations. The flight paths of the satellites are tracked by dedicated monitoring stations. Then the agency responsible for the satellites contacts each GPS satellite regularly with navigational updates using dedicated or shared ground antennas. These updates synchronize the atomic clocks on board the satellites to within a few nanoseconds of each other, and adjust the ephemeris of each satellite's internal orbital model.

The user segment is composed of hundreds of thousands of U.S. and allied military users of the secure GPS Precise Positioning Service, and tens of millions of civil, commercial and scientific users of the Standard Positioning Service. In general, GPS receivers are composed of an antenna, tuned to the frequencies transmitted by the satellites, receiver-processors, and a highly stable clock (often a crystal oscillator). They may also include a display for providing location and speed information to the user. Each segment introduces error into the equation and, while GPS provides reliable information regarding the general location of an object, it fails to provide precision information. Moreover, it is fundamentally limited in that it requires an unobstructed line of sight to each of at least 4 satellites.

To address some of the limitations of GPS, it has been determined that localization based on range information (i.e. video, radar, sonar or laser data) can provide positional improvements, especially in urban situations or outdoor areas with visible features. According to one embodiment of the present invention, GPS technology is seamlessly integrated with simultaneous localization and mapping to provide enhanced navigation, search and detection. Clear, persistent features that can be seen by the laser or other range finding apparatus can provide very robust data regarding the surrounding environment. In situations in which there are known locations of persistent objects, a laser (or other range finder) can be integrated with GPS data to narrow the variances in positional awareness. For example, if a GPS signal provides a location within a number of meters and based on that location the device should be able to identify two or more puissant objects of a known location, the range information can be used to improve the accuracy of the GPS position. However, this technology has definite limitations, especially if there are no persistent obstacles for the system to localize off of and again, laser or range technology in general requires an unobstructed line of sight to the persistent objects, as well as that the identified objects must be of a known location.

Another type of positional sensor that is contemplated by the present invention is an inertial sensor. Together with radio beacons and GPS, inertial sensors form the basis for most navigation systems in aircraft. Inertial systems operate based on perceptions of motion; that is the measurements of acceleration and displacement from a known position. If an object knows its starting location, using data that provides both linear and angular acceleration and the laws of motion, the displacement of an object from that known location can be determined. Gyroscopes, both mechanical and optical, can be used to measure linear and angular motion through applications of the law of conservation of momentum. Unlike GPS or range localization, inertial navigational systems are self-contained. That is, they do not depend on any other source of information to determine an objects position. For example, if a device equipped with an inertial navigation system was instructed to proceed from its current location to another location measured from its point of origin, the device would know when it arrived at that location, as well as its position at any time during the motion, relative to its origin. It would not matter if it was in an open field or in the basement of a building or in a cave. However, inertial navigation systems are only as good as the initial data that was input into the system (its initial location) and any precession in the equipment over time. All inertial navigation systems suffer from integration drift: small errors in the measurement of acceleration and angular velocity are integrated into progressively larger errors in velocity, which are compounded into still greater errors in position. Since the new position is calculated from the previous calculated position and the measured acceleration and angular velocity, these errors accumulate roughly proportionally to the time since the initial position was input. Therefore, the position must be periodically corrected by input from some other type of navigation system. The accuracy of an object's location varies based on the accuracy of the initial data and a point at which the object's actual position was updated.

A related means by which to determine position, and one contemplated by the present invention, is dead reckoning or path integration. In navigation, path integration is the process of calculating one's current position by using a previously determined position, or fix, and advancing that position based upon known or estimated speeds over elapsed time and course. Animals and humans instinctively practice path integration. For example, when you get up from a desk and go down the hall to the coffee room, you record distance of travel, turns and stops. If you would attempt to make the same trip with your eyes closed, accuracy would surely suffer, but most individuals would be able to recreate their path and/or understand their position.

Path integration is subject to cumulative errors. While the use of GPS and other positional resources have made simple dead reckoning seemingly obsolete, for most purposes, dead reckoning can provide very accurate directional information and positional information. Dead reckoning may give the best available information on position, but is subject to significant errors due to many factors, as both speed and direction must be accurately known at all instants for position to be determined accurately. For example, if displacement is measured by the number of rotations of a wheel, any discrepancy between the actual and assumed diameter, due perhaps to the degree of inflation and wear, will be a source of error. As each estimate of position is relative to the previous one, errors are cumulative.

Dead reckoning can be implemented to overcome the limitations of GPS technology. Satellite microwave signals are unavailable in parking garages and tunnels, and often severely degraded in urban canyons and near trees due to blocked lines of sight to the satellites or multipath propagation. In a dead-reckoning navigation system, the system is equipped with sensors that know the wheel diameter and record wheel rotations and steering direction. The navigation system then uses a Kalman filter, that is an algorithm that uses a series of measurements observed over time, containing noise (random variations) and other inaccuracies, and produces estimates of unknown variables that tend to be more precise than those based on a single measurement alone, to integrate the available sensor data with the occasionally unavailable position information into a combined position fix. Using this method, a navigation system in a car, for example, can tolerate going into a tunnel or traveling between large buildings that would otherwise obscure the GPS signal.

Another component of the collaborative positioning approach of the present invention involves using active ranging technology such as an ultra wide-band (UWB) radio frequency (RF) identification (ID) tag (collectively RFID). An RFID system consists of tags, a reader with an antenna, and software such as a driver and middleware. The main function of the RFID system is to retrieve information (ID) from a tag (also known as a transponder). Tags are usually affixed to objects such as goods or animals so that it becomes possible to locate where the goods and animals are without line-of-sight. A tag can include additional information other than the ID. As will be appreciated by one of reasonable skill in the relevant art, other active ranging technology is equally applicable to the present invention and is contemplated in its use. The use of the term "tags" or "RFID tags," or the like, is merely exemplary and should not be viewed as limiting the scope of the present invention.

An RFID reader together with an antenna reads (or interrogates) the tags. An antenna is sometimes treated as a separate part of an RFID system. It is, however, more appropriate to consider it as an integral feature in both readers and tags since it is essential for communication between them. There are two methods to communicate between readers and tags; inductive coupling and electromagnetic waves. In the former case, the antenna coil of the reader induces a magnetic field in the antenna coil of the tag. The tag then uses the induced field energy to communicate data back to the reader. Due to this reason, inductive coupling only applies in a few tens of centimeter communication. In the latter case, the reader radiates the energy in the form of electromagnetic waves that possess much longer range opportunities. Some portion of the energy is absorbed by the tag to turn on the tag's circuit. After the tag wakes up, some of the energy is reflected back to the reader. The reflected energy can be modulated to transfer the data contained in the tag.

In one implementation of the present invention, a RFID or UWB tag cannot only be associated with a piece of stationary infrastructure with a known, precise, position, but also provide active relative positioning between objects. Moreover, the tag can be connected to a centralized tracking system to convey interaction data. As a mobile object interacts with the tag of a known position, the variances in the objects positional data can be refined. Likewise, a tag can convey between objects relative position and relative motion. Such tags possess low-detectability and are not limited to line of sight nor are they vulnerable to jamming. And, depending on how mounted and the terrain in which they are implemented, a tag and tracking system can permit user/tag interaction anywhere from 200 ft to 2 mile radius of accurate positioning. Currently, tags offer relative position accuracy of approximately +/-12 cm for each interactive object outfitted with a tag. As will be appreciated by one or reasonable skill in the relevant art, the use of the term object is not intended to be limiting in any way. While the present invention is described by way of examples in which objects may be represented by vehicles or cellular telephones, an object is to be interpreted as an arbitrary entity that can implement the inventive concepts presented herein. For example, an object can be a robot, vehicle, aircraft, ship, bicycle, or other device or entity that moves in relation to another. The collaboration and communication described herein can involve multiple modalities of communication across a plurality of mediums.

As previously discussed, conventional sensor fusion approaches involve continuous receipt and transmission of detailed raw data that requires high bandwidth communications systems. High bandwidth communications systems are very expensive and this approach often imposes a high workload on users or analysts to extract locally relevant insights across even a few modalities to geographically separated users. Moreover, existing strategies do not answer the questions "Where do I go (or not go) from here?" or "What is moving towards me?" in a timely manner.

FIG. 1 presents a high-level block diagram of a system 100 for collaborative spatial positioning according to one embodiment of the present invention. According to one embodiment of the present invention, an object 110 can employ collaborative spatial positioning by receiving positional information from one or more positional determination resources 150. These resources can, in one embodiment of the present invention, include global positioning satellites 120, path integration 130, inertial navigation systems 140, ultra wide band tag localization 160, and range localization 170.

As is described herein, the present invention combines various forms of positional data to arrive at a spatial representation of an object in its environment. In one instance that representation may be globally based or spatial however, in other instances, the representation may be based on a different set of reference indicators or an object may generate its own frame of reference. Indeed, the present invention contemplates scenarios in which one or more objects, or groups of objects, can operate or generate differing frames of reference (spatial awareness) that are seamlessly integrated.

In one implementation of the present invention, the object 110 receives position information or data from various positional determination resources 150 that aids in the object's determination of its spatial location. As one of reasonable skill in the relative art will appreciate, and as discussed above, each positional determination resource 150 possesses advantages and disadvantages. GPS 120, for example, requires an unobstructed line of sight to (optimally) 4 orbiting satellites that each transmit separate and time identification signals. Based on the reception delay of the received signals, the receiver can compute a probabilistic location. But, should the object 110 enter a building or region in which the line of sight between these satellites is obstructed or obfuscated, the positional determination becomes unreliable. Moreover, despite GPS' worldwide acceptance for general locational services, it does not provide adequate accuracy for precision movements.

Similarly, the object 110 may receive positional information from an inertial navigation system 140. Unlike GPS 120, an inertial navigation system measures accelerations and time to determine relative displacement of the object 110 from an initial starting position. Thus, moving into a building, cave or under a canopy of trees does not affect the operation of such a system. However, the system is limited by not only the accuracy of its starting point but also its ability to maintain a stable platform. If the location of its initiation point is in error, then its determination of position based on displaced motion is also in error. Such platforms are also known to precess, meaning that over time the system is less and less accurate. This precession is magnified if the accuracy of the starting point is questionable. If the system, during operation, is updated to provide parameters for its variance, it can assume that the update is accurate and thus the difference from where it is, based on the update, and where it thinks it should be, is based on drift in the system. The system can then continue to adjust for such drift. However, if the initial location was inaccurate, an update can introduce error rather than eliminate error, making the system more inaccurate than if it was simply left alone. As one of reasonable skill in the art will appreciate, as with GPS, inertial navigation systems also have their limitations.

The present invention integrates positional information from a plurality of sources so as to determine the object's 110 spatial location. GPS 120, inertial navigations systems 140, path integration 130, range localization 170, and other positional determinative resources 150 are synthesized by the collaborative spatial positioning process to arrive at an optimal, reliable and accurate position. This synthesis includes weighing each source based on its perceived accuracy and historical variance. By doing so, the determination and accuracy of an object's position can be maintained despite varying degrees of accuracy and reliability of any one positional determination resource. According to another embodiment of the present invention, the process by which positional determinative resources 150 are combined can also be based on agreement or disagreement between resources as to the location of the object. For instance, if three of four positional resources agree as to the location of the object, the fourth determination can be dismissed as likely being in error. However, the determination of which resource to rely upon becomes more difficult when there are multiple conflicts or multiple agreements as to a differing location of the object. According to one embodiment of the present invention, the positional determinative resources are prioritized based on a plurality of factors. Using this sort of priority schedule, a determination can be made as to which resource (or combination of resources) to rely upon should there exists a conflict between the individual positional determinations. For example a GPS determination of an object's position (albeit inaccurate) may generally agree with a vision detection systems determination. But both of these disagree with that produced by a laser system that, while very accurate, possesses ambiguity as to which target it is measuring. Thus, one or more embodiments of the present invention assign and assess a value on each positional determination resource and then balance these determinations to arrive at the highest probable location. By combining positional determination resources in such a manner those sensors that provide unambiguous reports such as UWB tags, RFID tags, GPS and the like, can be sued to provide a 'rough' location of a target and then resources that possess more precision (albeit sometimes ambiguous) can be used to refine the locational information.

For example, one object may be able to determine the location of another nearby object or target using UWB tags or GPS to within 2 meters. Using that information, a laser range finder can be trained to that general location the reduce the accuracy of the locational information to millimeters. However, if the laser was used independently it may just as well identify another target 3 meters to the left as the laser's field of view is very narrow. Rules can be developed and established regarding the collaboration of positional determinative resources.

The present invention goes beyond fusion of sensory data by also capturing and using the positional awareness of other objects in the system 100. This peer-to-peer communication enables otherwise isolated objects to ascertain a precise positional determination based not only on internal sensory data, but the positional determination and data of one or more other objects or nodes.

According to one embodiment of the present invention, and as shown in FIG. 1, a communication link is established between other collaborative spatial positioning objects 110, 180. In one implementation of the present invention, a UWB tag 160 provides a means by which to exchange data and positional awareness between two or more objects within the system 100. The collaborative nature of the exchange of data between objects lets each object not only determine its relative position independently, but gain additional resources and accuracy by linking to that of another object. Moreover, each object can provide the other with not only its position in a spatial sense, but its relative local position. For example, two linked objects may know within a certainty their spatial location within 1 meter, but at the same time be able to provide a relative position with accuracy to a few centimeters. In addition, linking to additional objects can enable a single object to determine its relative position and, in some instances, its spatial position. In other instances of the present invention, such a communication link between other objects can be used to provide additional data to enhance internal positional determination capabilities. Moreover, the data that is conveyed can be at various levels of specificity. For example, in one embodiment of the present invention, each object can independently determine its spatial position. That object can then convey its determination of its spatial position to other objects within the same frame of reference. Alternatively, and according to another embodiment of the present invention, objects can convey specific positional data about its spatial position which can then be discretionarily used by other objects. For example, an object can convey that, within a certain reference frame, its location is X with a certain degree of variance. Alternatively, or in addition, it can also convey GPS information, inertial information, range triangulation information, etc., so that the receiving entity can then use or discard such specific information based on accuracy or data it requires to enhances its own spatial awareness. This combination of accurate relative position data combined with a collaborative spatial position determination enables embodiments of the present invention to accurately integrate combined motion and activities, including predictive behavior and interactions.

One should recall that while the invention has been, and will be, particularly shown and described with reference to embodiments, it will be understood by those skilled in the art that various other changes in the form and details may be made without departing from the spirit and scope of the invention.

Figure 2:
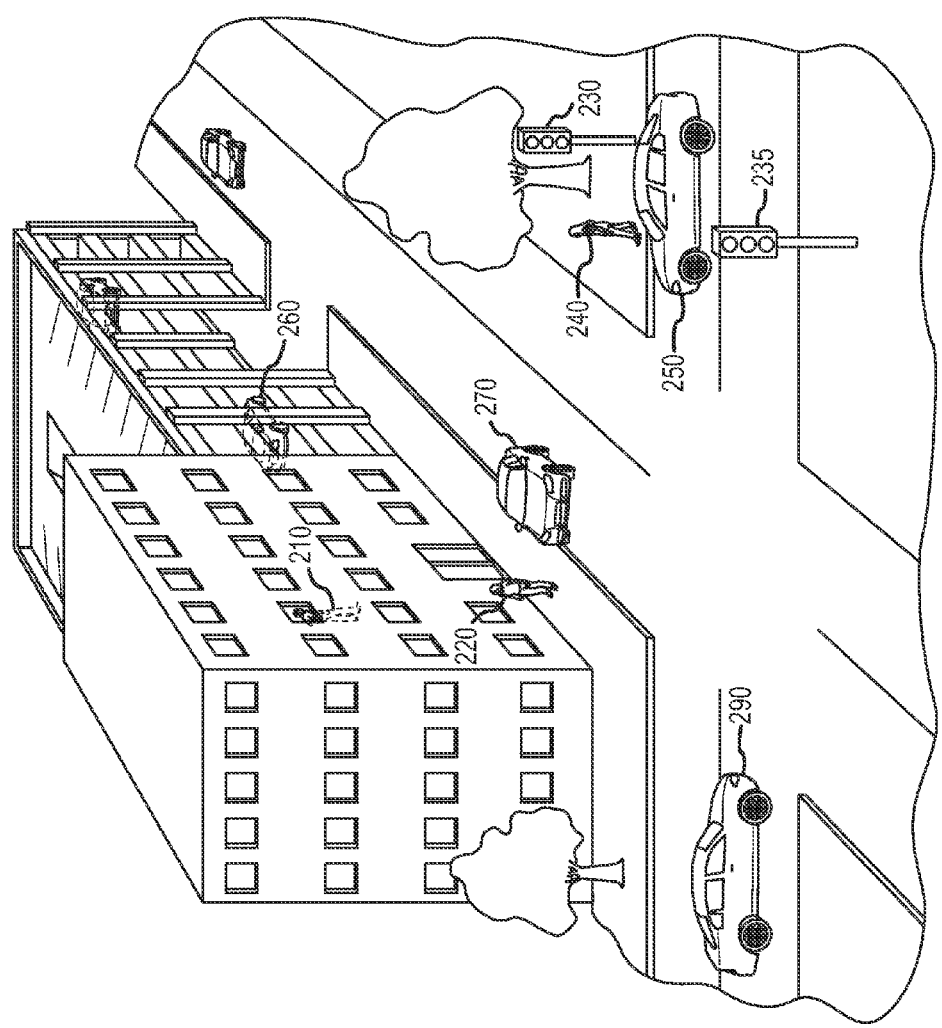
FIG. 2 shows a makeshift urban environment in which collaborative spatial positioning according to one embodiment of the present invention may be implemented.

To better understand the complexities of the collaborative spatial positioning and probabilistic conflict resolution system of the present invention, consider the following simplified example. FIG. 2 shows a makeshift urban environment in which conflict resolution based on object behavioral determination and collaborative relative positioning according to one embodiment of the present invention may be implemented.

Assume a plurality of objects 210, 220, 240, 250, 260, 270 exists wherein each internally possess the ability to utilize one or more positional resources to determine their spatial location. For example, each object may possess a GPS receiver, inertial systems, laser localization, dead reckoning technology, and the like, and as well as being equipped with an UWB tag for interactive communication. Each, however, has differing abilities to utilize each of their resources. For example, two of the objects 210, 220 may be in a location, a building for example, where a GPS signal is not available or where there are limited range localization opportunities, but each possess accurate data with respect to the local environment. In essence, they cannot independently determine their spatial position. That is, they may have a map of the environment, but they do not know, with any accuracy, where they are on the map. A third and fourth object 240, 250 possess a GPS location, but given the signal strength and interference, its accuracy is questionable. However, both of these objects 240, 250 are within range of a known positional markers 230, 235. The markers possess a known spatial location, and using relative locational technology, the objects close to that tag, despite having poor GPS reception, can accurately determine their location.

As one of reasonable skill in the relative art will appreciate, to determine a spatial position based on range information requires three independent sources. An object receiving a signal from a transmitter can determine it is of a certain range from that transmitter. Knowing the transmitter's location, the receiver can conclude its position is on the surface of a sphere whose radius is the range of transmission and whose origin is the location of the transmitter. Receiving information from two such sources provides the intersection of two spheres which forms a circle. Thus, the receiver in this example resides somewhere in the intersecting circle. Ideally, three intersecting spheres identifies the point at which the receiver resides. However, it is possible use an object's independent determination of its spatial location to reduce the locus of points of where it is located. An object receiving range information from two known positions 230, 235 knows it exists on a circle defined by the intersection of two spheres. But it itself possesses information regarding its spatial location that can be integrated with the received information to refine its spatial location.

Continuing with the example shown in FIG. 2, assume further that two nearby objects 240, 250 are in communication with each other and both are in communication with fixed markers (streetlights) 230, 235. But as previously indicated, the independent geospatial resources (GPS) of the two objects 240, 250 is unreliable. However, each can act as a third source of positional data to assist in the other to arrive at a more refined and precise geospatial location. As mentioned, the data received from the fixed location markers 230, 235 provides an intersection location of a circle. From the first object's 230 perspective, range information from the other object 250 can result in a definitive geospatial location. That information combined with its internal variances can provide that object 230 with a better, more refined determination of its location. This type of peer-to-peer spatial location can be used to determine the location of an object absent of any communication to a fixed marker. The more object interaction, the more accurate the location.

According to one embodiment of the present invention, the positional information of one object 240 ascertained in part by markers 230, 235 and its GPS (or interaction with other objects) can be conveyed via a peer-to-peer communication to other objects 270, 250, 220. The car 250 next to the markers 230, 235 will also possess accurate positional data ascertained from the makers 230, 235 and other nearby objects. However, the car in the intersection 270, and more importantly the object within the building 220, may find the positional data possessed by another object very valuable. With such relative positional data, the other objects 220 can determine their spatial location that is thereafter supplemented by their internal systems to aid in positional awareness. Moreover, an object that is further isolated in the building 210 can use information that is relayed via a daisy chain or a mesh network to gain accurate positional information.

In the same manner, an individual who cannot independently determine their position from GPS or other sources can leverage the known spatial of nearby objects. The person in the lobby of the building can, according to one embodiment of the present invention, determine its location despite its inability to receive any GPS data because it can receive data from other nearby objects 270, 290, 240, 230, 235 whose position is known. With its position known and possessing a map of its local environment, it can navigate with a great deal of accuracy to areas without any traditional spatial support. And as the person in the lobby 220 now knows its geospatial location it can convey that information to other isolated objects 210. If, for example, the person on the third floor 210 can receive data from the person in the lobby 220 and two others, it too can determine its geospatial location. This process can daisy chain so as to provide geospatial location based on sources that are they themselves have determined their spatial location from indirect sources.

Spatial and relative positional data can be conveyed from and between other isolated objects. For example, a car located in a parking garage 260 can include a collaborative spatial positioning apparatus or system as well, as can a cellular phone carried by its driver. While driven, the car can gain GPS signals and, upon entering into the garage, the car can use path integration or inertial navigation to generally ascertain its position within the garage. Using data from either fixed or other nearby objects, these objects can determine and refine their spatial location. Moreover, the individual within the building 210 can also establish relative locational data with the car 260 should they need to reunite at the end of the day.

According to one embodiment of the present invention, each of the objects depicted in FIG. 2 possesses the ability to create and possess a centric oriented spatial awareness representation of the local environment. By an object possessing such a representation of the relative location and motion of the objects around it, that object can autonomously determine whether there exists a probabilistic conflict that warrants behavior modification. For the purpose of the application, a probabilistic conflict is an algorithmic determination that two objects within the spatial representation will interact/collide/conflict. One of reasonable skill in the relevant art will appreciate that the collection and analysis of data on a real time basis will yield statistical probabilities rather than bright-line event determinations. Moreover, the determination of what is statistically significant to one object or one action may be different from another. For example, the speed at which the object is traveling and the object's reaction speed may necessitate considering and reacting to more potential conflicts while an object moving slower or with the ability to quickly remove itself from the environment may have a much higher level of conflict likeliness before action is taken.

Using predetermined protocols, the present invention continually examines probable conflicting outcomes and, once an outcome or interaction meets or exceeds a probabilistic level, the present invention initiates a process by which the behavior of one or more of objects involved is modified.

For example, turning back to FIG. 2, consider that a person carrying a cell phone 240 is walking along the sidewalk and projected to cross the street at the intersection. At the same time, an automobile 290 is traveling toward the intersection. Both objects possess various positional determining resources and are equipped with UWB tags so to not only update and verify their positional accuracy, but to convey to each other their location and relative motion. Both objects 240, 290 create their own object centric spatial awareness representation, which includes the position and motion of travel of the other. According to one embodiment of the present invention, both objects independently determine that there is high probability that a conflict between the two objects 240, 290 will occur. According to one embodiment of the present invention, once a conflict is recognized and it reaches a certain threshold of probability that a conflict will occur, each object, independently, can modify its behavior to resolve, prevent or mitigate the conflict. In this case, the cell phone could issue some sort of alert to assist the individual not to walk into the intersection. The automobile can also issue to the driver an alert to slow down or yield. Moreover, if the conflict persists, the automobile can initiate a process by which it slows down or stops to prevent a collision regardless of the actions of its driver. If one object acts before the other and resolves or eliminates the conflict, the other object can conclude that no further action is necessary.

Figure 3:
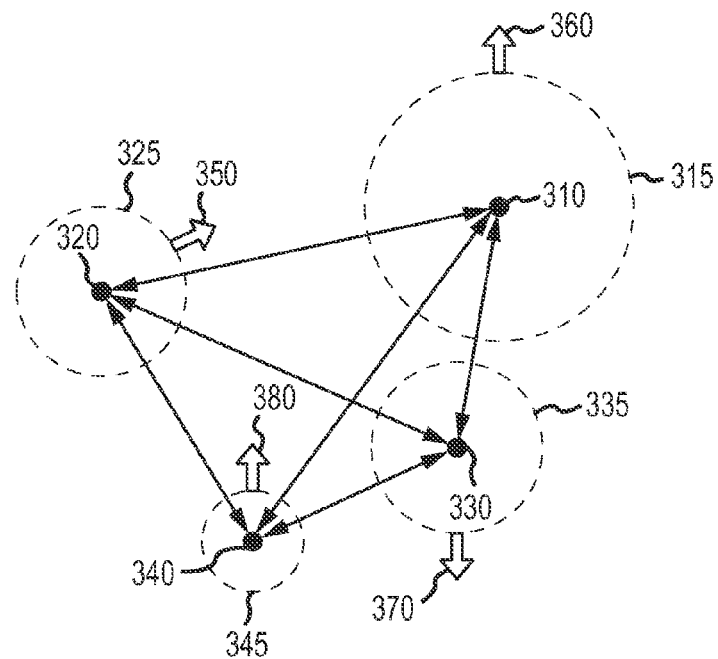
FIG. 3 shows a high level depiction of a mesh network interaction of a plurality of objects possessing collaborative spatial positioning technology.
Figure 3:
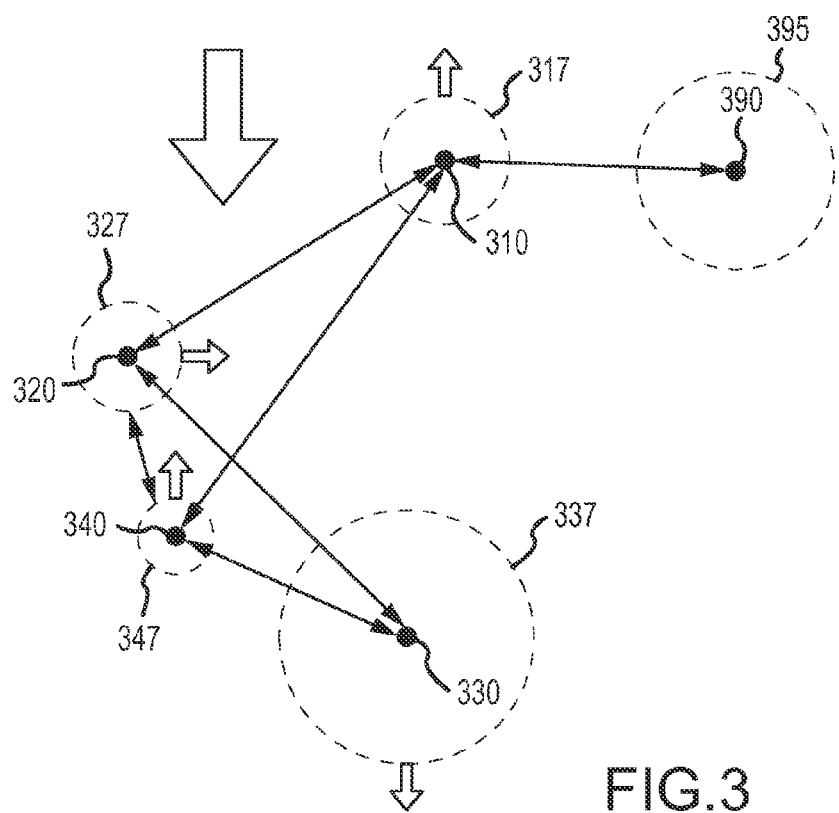

As mentioned, one aspect of the present invention is its ability to collaboratively share and use spatial and relational data so as to identify and resolve potential conflicts. To better understand how the present invention identifies and resolves these concepts, consider the following. FIG. 3 shows a high level depiction of a mesh network interaction of a plurality of objects possessing collaborative spatial positioning technology. In the upper portion of FIG. 3, four objects 310, 320, 330, 340 are within collaborative range of each other and are each communicatively linked forming, what one of reasonable skill in the relevant art would recognize as a mesh network.

Surrounding each object 310, 320, 330, 340 is a ring 315, 325, 335, 345 representing the variance, or error, of each object's independent determination of its spatial position. In addition, each object includes an arrow 350, 360, 370, 380 representing the relative motion of each object. As objects come within communication range of each other, new objects are joined to an existing mesh while others exit the network. While one could abstractly view a mesh network as an infinite number of nodes, it is unlikely that such a network is feasible. A more likely scenario is a mesh network based on a central or regional control node or autonomous mesh with a limited number of nodes. In the later example, one node is established a controlling node, while a finite number of client or slave nodes form the mesh. As new nodes enter or nodes exit the relationship, control of the mesh is reevaluated as is the interaction and overlapping of mesh networks. Furthermore, nodes can exist in two or more mesh networks resulting in an overlap of data transfer. Obviously, packet and data collisions within networks of this type must be resolved and are beyond the scope of this discussion. For the purposes of the present invention, assume that the objects shown in FIG. 3 can form and maintain a mesh network operable to support the interaction of data among the nodes in the network.

In doing so, relevant spatial and translational data can be conveyed from one object to another. The lower depiction of the mesh network of FIG. 3 shows modified variances 315, 325, 335, 345 for each object 310, 320, 330, 340 based on the newly acquired spatial and relational data. For example, the variance 315 of an object 310 can decrease to form a new variance 317 based on newly acquired information. As the network changes, variances can increase as well 337. As new nodes 390 (and their variances 395) enter into the network, the exchange of relational and spatial data enables a continual modification of each object's ability to determine its collaborative spatial position and, in one embodiment, affect its behavior.

Figure 4:
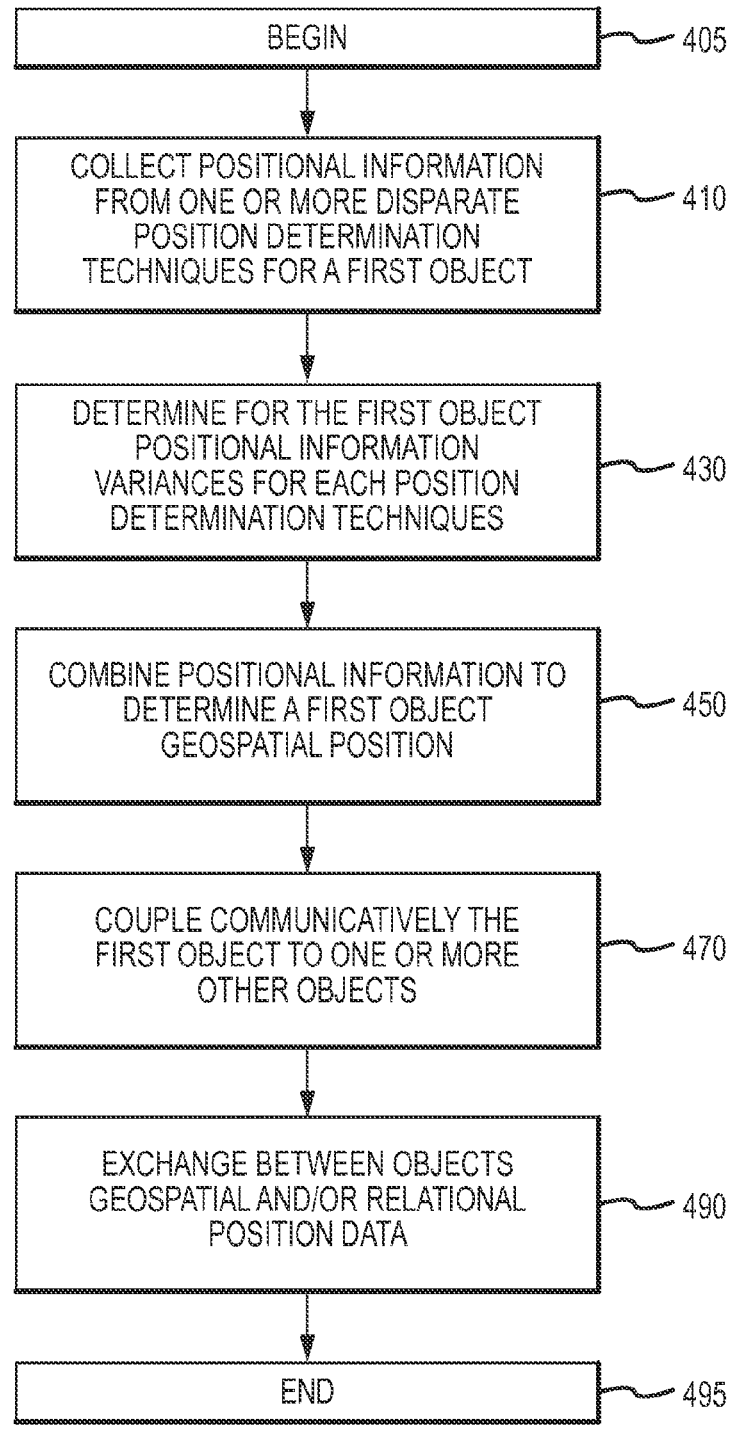
FIG. 4 is a flowchart depicting an example of the methodology that may be used to collaborate positional information according to the present invention.

FIG. 4 is a flowchart depicting one example of the methodology that may be used to collaborate positional information according to the present invention. It will be understood by one of reasonable skill in the relevant art that each block of the flowchart illustrations, and combinations of blocks in the flowchart illustrations (and other flowchart illustrations in this application), can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture, including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware or firmware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words," or the like. These specific words, however, are merely convenient labels and are to be associated with appropriate information elements.

Unless specifically stated otherwise, discussions herein using words such as "processing," "computing," "calculating," "determining," "presenting," "displaying," or the like, may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

An exemplary process for collaborative spatial positioning according to the present invention begin 405 with the collection 410 of positional information from one or more disparate positional determination techniques or resources. These resources can include inertial systems, GPS, path integration, range localization, and the like. For an object, positional variances for each positional information resources are determined 430 so that the information provided by each resource can be weighed and valued by the object. Those with a high degree of accuracy and reliability are normally weighed and valued more than those with less accuracy and lower reliability. These variances are continually monitored and updated so that the computed spatial position is optimized.

The positional information, once evaluated and weighed, is thereafter combined 450 to determine for an object its spatial position. In addition to the individual variances of each informational source, the overall determination of position is bound so as to convey to other objects the degree of accuracy by which an object is conveying its position.

Objects are communicatively coupled 470 so as to exchange 490 spatial and relational positional information that can be then used to refine each objects' spatial location and spatial awareness. The accuracy and reliability of this information is also conveyed so that the receiving object can determine the value of the information conveyed.

The present invention integrates localized relational positional data with fused sensor data relating to spatial positioning. By doing so, objects are not only able to more accurately determine their spatial location and relative motion in a variety of environments, but, when necessary, modify their behavior based on the location and relative motion of nearby objects.

Figure 5:
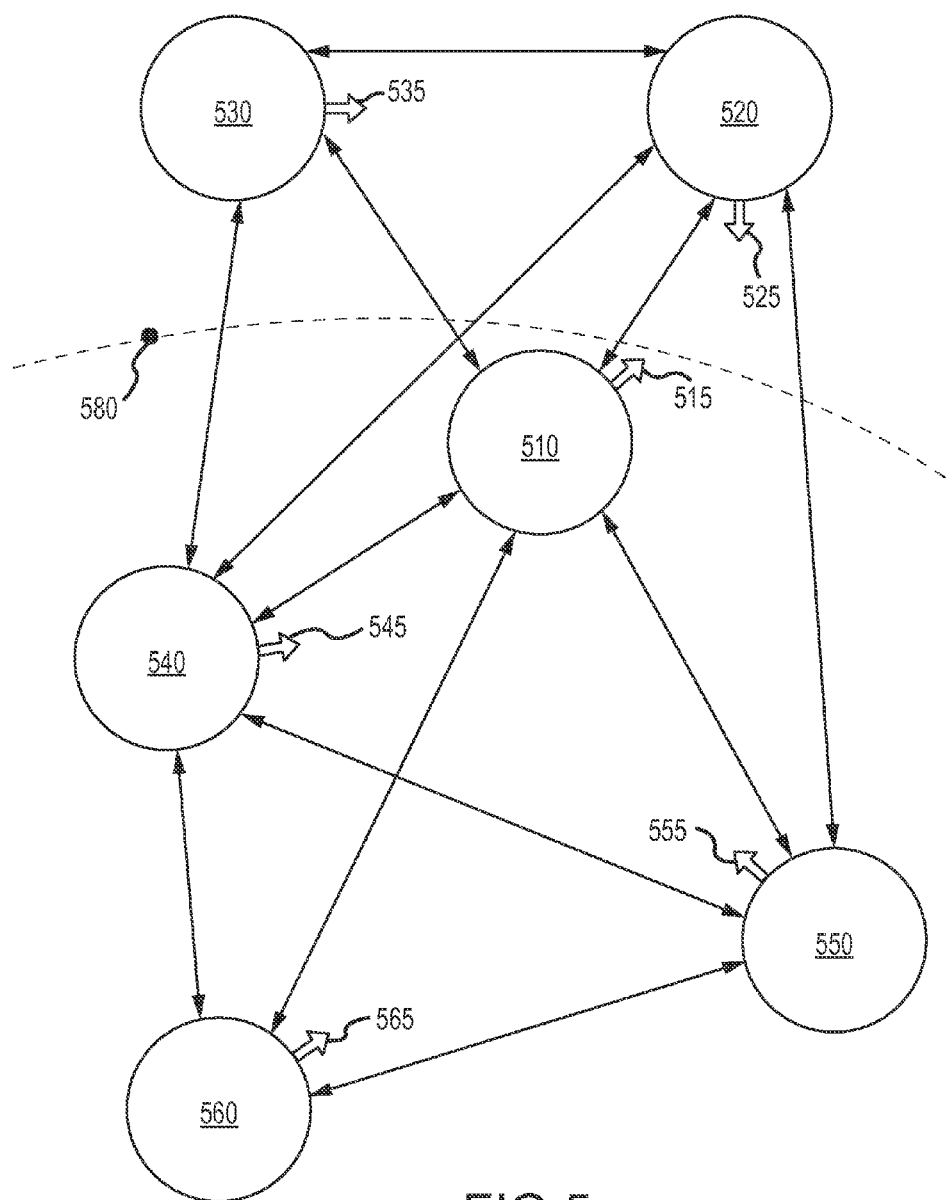
FIG. 5 is a high level graphical depiction of a plurality of collaborative objects using positional determination and collaborative behavior modification according to one embodiment of the present invention.

FIG. 5 is a high level depiction of a plurality of objects using conflict resolution based on object behavioral determination and collaborative relative positioning according to one embodiment of the present invention. In the rendering of FIG. 5 six (6) objects 510, 520, 530, 540, 550, 560 are operating in the same geographic location. One skilled in the relative art will appreciate that the "local" geographic location is, for the purpose of the present invention, only limited by communicative technology. In one instance the objects may be within meters of each other and in other instances miles apart.

FIG. 5 further indicates that each object possesses a certain range of awareness centered around that object. For example, assume that the central object 510 is independently aware of each of the remaining objects 520, 530, 540, 550, 560 while the object 560 in the lower left quadrant possesses an awareness range 580 that is only sufficient to capture knowledge of three nearby objects 510, 540, 550. According to one embodiment of the present invention, these nearby objects 510, 540, 550 can relay information to a distant object 560 to enhance that object's ability to determine is spatial awareness. In that way, an object 560 can know and understand of a distant object's 520 relative position and motion. It can then independently determine whether that track is of significance or whether it should be ignored. That is to say, that through peer-to-peer communication one object 560 can become aware of another 520 even though it cannot independently detect that object 520. Moreover, if that object and its relative motion is of no consequence, it can be ignored or removed from the spatial representation. However, if that object's 520 relative position, direction and speed are of a scope that, should it continue on its current path, it will become a conflict, the present invention enables either object 520, 560 to react, even though neither can independently detect the other. For example, one object may be traveling so fast that by the time it is locally and independently identified by the other object 520 a collision may be too unpreventable.

The detection and interaction with nearby objects enables each object to develop a spatial representation of its surrounding and react accordingly. As shown in FIG. 5 and in accordance with one embodiment of the present invention, each object's awareness of nearby objects not only includes is relative position, but also the object's state. That is the object's relative motion, speed, mission objective, reaction time, capabilities, and the like. The motion of each object is shown in the rendering of FIG. 5 as a large arrow 515, 525, 535, 545, 555, 565. As the objects interact and refine their spatial position, they further collect information such as speed and direction of travel of nearby objects. This enables each object to create a local spatial representation or awareness of its environment and search for probabilistic conflicts.

Figure 6:
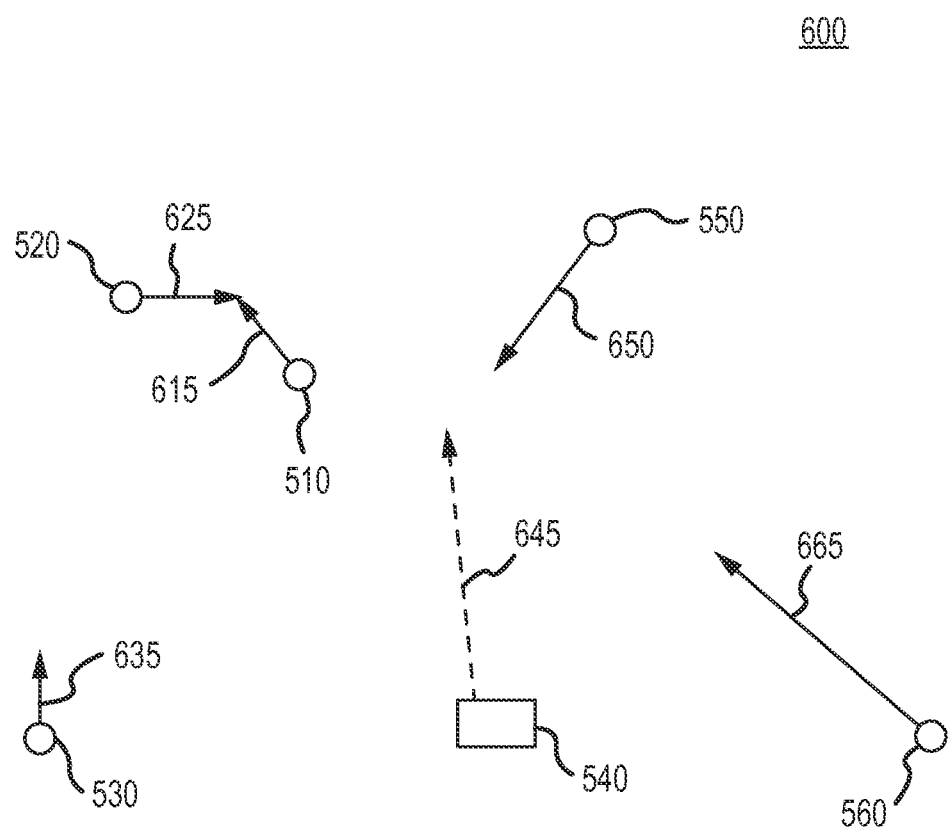
FIG. 6 is an object centric relational representation of a plurality of nearby objects shown in FIG. 5, as can be determined according to one embodiment of the present invention.

FIG. 6 is an object centric relational representation of the plurality of nearby objects shown in FIG. 5, as can be determined according to one embodiment of the present invention. The rendering shown in FIG. 6 is object centric about the left most object 540 in FIG. 5. That is to say, that the rendering of FIG. 6 provides relational information regarding nearby objects from the perspective of one object 540. While each object's spatial representation may represent the same data, each would be different and independent. Moreover, each may have different variances in positional reliability and accuracy. FIG. 6, the central object 540 detects five (5) other nearby objects. From its perspective, three objects 510, 520, 530 are on its left side and two 550, 560 are on its right. All of the objects are either abreast of its position or in front of its position. Thus, the spatial representation provides to the centric object 540 relational positional data regarding each nearby object.

The representation of each nearby object 510, 520 530, 550, 560 further includes object attributes, including motion of the object. In this embodiment of the present invention, the relative motion of each nearby object is shown by an arrow 615, 625, 635, 655, 665 wherein the length of the arrow represents speed relative to the central objects' speed and direction 645. For example, the motion of the leftmost object 530 and that of the center object 540 are essentially parallel. However, the leftmost object 530 is moving considerably slower than the center object 540 as seen by a comparison of the size of the two directional arrows 635, 645. Similarly, the speed of the center object 540 and the lower right object 560 are similar, but each is oriented in a different direction. In another embodiment of the present invention, the spatial representation shown in FIG. 6 can be purely object centric while in another, it can utilize a common frame of reference.

The spatial representation shown in FIG. 6 can also, in other embodiments of the present invention, include additional information such as an indication of the positional reliability of each object or whether an object has a higher mission priority than another. For example, an object can be shown as a dot within a circle where the dot represents the determined spatial position of the object and the size of the circle the variance of that determination. A small circle surrounding a dot indicates the location is highly reliable and accurate, while a larger circle means that the actual position, while represented as being in the center of the circle, may be anywhere within the circle.

Figure 7:
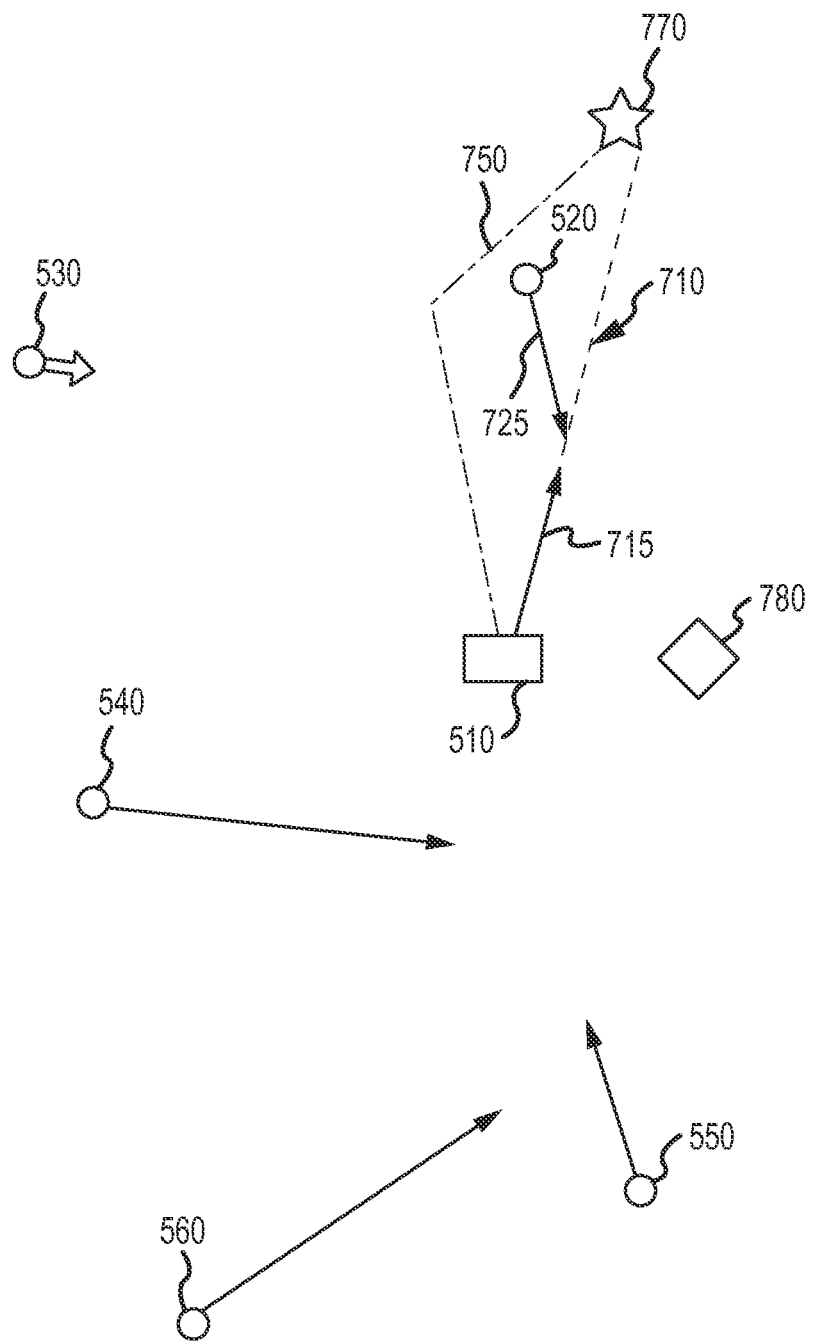
FIG. 7 is another object centric relational representation of a plurality of nearby objects shown in FIGS. 5 and 6, showing one embodiment of behavior modification according to one embodiment of the present invention.

FIG. 7 is another object centric relational representation of a plurality of nearby objects shown in FIGS. 5 and 6 showing one embodiment of behavior modification according to one embodiment of the present invention. In this case, the spatial representation shown is based on the central object of FIG. 5 510. Accordingly, three objects 540, 550, 560 are behind the central object 510 and two objects 520, 530 are in front of the object 510. FIG. 7 includes motion vectors consistent with FIG. 6, albeit in a relational representation to a different object 510.

In addition to relative positional information (range and bearing) and speed of travel, FIG. 7 further includes behavioral information. In this case, the mission objective (arrive at a destination) of the central object 510 is represented as a star 720 and its proposed route to the objective 770 is represented by a dashed line 710. Alongside the proposed primary route 710 is the central object's motion vector 715 indicating its relative instantaneous speed and relative direction of travel. FIG. 7 further depicts the mission objective of a nearby object 520 as a pentagon 780 and that object's motion vector 725.

According to one embodiment of the present invention, each object prioritizes state information received from each of the nearby objects and determines whether there is a probabilistic conflict between nearby objects. According to one embodiment of the present invention, the behavior engine in coordination with the spatial awareness engine and guarded motion module in each object independently determines that, should the objects maintain their current course and speed, a conflict, such as a collision between the objects, is likely. Based on the interaction of the objects and the state information conveyed, each object prioritizes their respective objectives 770, 780. The central object shown in FIG. 7 is aware that a collision is likely and that its objective has a lower degree of priority than the conflicting object. Thus, the behavior engine modifies the proposed course to a secondary route 750 or, alternatively, stops (or reduces its speed) until the collision potential is averted. The other nearby object 520, having a higher priority objective, maintains its proposed route to its objective 780. Significantly, this determination, while coordinated, is made independently by each object. The exchange of state information between objects toward the objective of prioritizing behavioral modifications can be based on a wide variety of factors. For example, a car approaching a railroad crossing at the same time of an approaching train may react differently than if the conflict were with a bicycle on a bicycle path. Perhaps in both instances the automobile possesses a higher objective priority, but the train, based on its mass, speed and ability to modify its motion, is simply incapable of altering its course or significantly, in the near term, modifying its speed. Knowing these factors, the automobile can modify its approach to resolving the conflict. One more embodiment of the present invention, thus considering such factors as the characteristics and capability of the other nearby objects and objects with which a conflict exists, in crafting an appropriate response. Factors can include momentum, fragility, maneuverability, value, importance of payload, time-sensitivity, and the like. Such characteristics can be broadcast to other nearby objects.

One skilled in the relevant art will appreciate that as objects move and their spatial relationship changes, individual prioritization and behavioral modifications must change as well. While each of the objects provide peer-to-peer integration of data, each object makes independent behavioral determinations.

Figure 8:
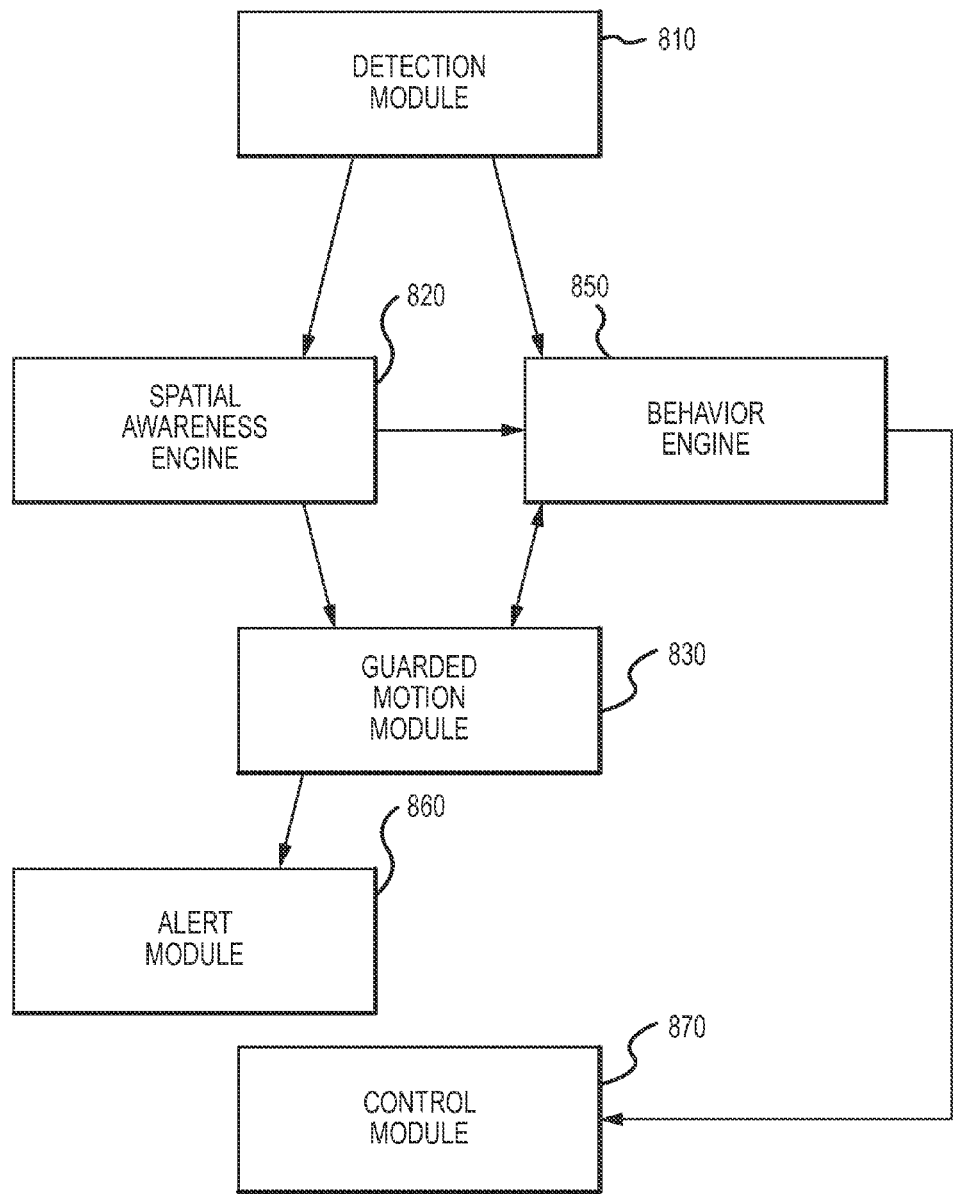
FIG. 8 is a high level block diagram of a system for distributed positioning and collaborative behavioral determination according to one embodiment of the present invention.

FIG. 8 presents a high level block diagram of a system for distributed positioning and collaborative behavioral determination according to one embodiment of the present invention. According to one embodiment of the present invention, one or more objects can each possess detection module 810 that is communicatively coupled to a spatial awareness engine 820 and a behavior engine 850. The detection module is operable to sense the presence of one or more nearby objects and to ascertain from those objects not only a relational position (range and bearing) of the object but certain state information. That information can include the relative motion of the object (speed and direction) as well as capabilities of the object, object physical attributes, mission parameters, and the like. The detection module can also gain spatial information from the object and use that information to not only establish that object's relative location, but also to enhance the receiving object's own spatial data. The detection of an object and determination of relational data can be obtained, in one embodiment, by Ultra Wide Band Radio Frequency Identification tags (also referred to herein as RFID tags) and other means as would be known to one of reasonable skill in the relevant art. The interaction and integration of these tags can be used to communicate informational data among various objects.

The information gained by the detection engine is conveyed, in one embodiment, to a spatial awareness engine 820. The spatial awareness engine 820 develops a relational representation of the environment in which the object operates. In one embodiment, the spatial representation is object centric, providing the object with continual information about other objects in its immediate vicinity. Each object produces and maintains its own spatial representation or map as well as its own positioning scheme. And while not necessary to merge the representations between various objects to a common map, the representation can contain common artifacts or fiducial markers that assist in correlating the maps and the position of each object. For example, the location of a fixed reference point can be represented in maps of several objects and then used by each as a common point of reference.

The spatial awareness engine can, in one embodiment of the present invention, abstract range and bearing data so as to be used in a tracking algorithm that can extract symbolic representations over time that represent changes in the environment consistent with entity definitions inputted into the system. For example, the present invention can react differently depending on whether an object is a large vehicle moving quickly or a person walking slowly. The output of such a representation includes motion trajectories that include time stamps and an indication of data degradation. For example, as data ages, the representation may become more and more unreliable thus modifying the response. These symbolic representations can be independent of those determined by using UWB tags that convey identification and state data. Thus, when a symbolic or raw data is correlated with tag information, the reliability of that entities' course and objective is enhanced. Likewise, the system can identify uncorrelated or nonparticipating entities.

Both the spatial awareness engine 820 and the detection module 810 convey data and are communicatively coupled to the behavior engine 850. The behavior engine 850 and the spatial awareness engine 820 are also communicatively coupled to a guarded motion module 830. The guarded motion module 830 assesses the relative position and state of each detected nearby object along with behavior attributes of the host object to determine whether there exists any probabilistic conflicts. For example, the guarded motion module 830 can determine, based on the spatial representation, that one of the nearby objects, as opposed to another, will conflict with the current path of the host object. In other embodiments, the guarded motion module 830 can determine that based on current trajectory the host object will encounter a known hazard that may jeopardize the ability of the host to carry out its mission. In this case, a hazard may include another object, a perimeter boundary, a fixed obstacle, and environmental factor, or the like. The guarded motion module can be equipped with a plurality of probabilistic algorithms to determine whether the motion of the nearby objects or other known hazards may challenge the object's ability to carry out its mission or jeopardize the health and wellbeing of the object itself.

The behavior engine 850 can use such information to coordinate actions of the host and/or nearby objects to achieve common tasking. The behavior engine can further selectively coordinate activities among the nearby objects based on the known mission objectives and perceived conflicts. The behavior engine can also react based on the awareness that one or more of the nearby objects may be a nonparticipating entity. Based on collected spatial or sensor data, it may be possible to determine the presence of a nearby object. But while the motion of the object can be tracked and conflicts predicted, its state as a non-correlated system may drive a different response by the behavior engine.

For example, and according to one embodiment of the present invention, a module can be mounted in a facility or environment of interest (playground or parking lot) that interacts with other nearby objects. As the mounted object remains in a fixed position its spatial awareness representation is consistent with the geographic or architectural characteristics of the environment. Moreover, the mounted module can be equipped with various range/bearing sensors including lasers, ultrasonics, stereo vision, radar, and the like. These systems enable the mounted module to detect and track objects within its vicinity in terms of a fixed coordinate system in the creation of its spatial awareness representation. The modules can also include the ability to interact with other objects using a UWB Radio Frequency Identification (RFID) tags that can provide additional state information.

This state information can include identification data that when compared to predefined list, can identify specific non-listed objects. For example, the mounted module can be placed in a secure facility to which limited access is granted. While entry into the area may be controlled by other means, the present invention has the ability to monitor on a real time basis all of the objects in the environment to verify each object's authenticity. Moreover, if a non-listed or unauthorized object is detected in an environment, the present invention can track its location and alert authorities with respect to its location and action.

To do so, the mounted modules of the present invention, according to one embodiment, can further include communicative ability to convey collected data to a central computer or processor. A correlation engine (not shown) can triangulate range and bearing information and coordinate data from multiple mounted modules to correlate and precisely track each objects location.

Thus, for example, in a room in which three mounted modules are located at geographically disparate positions in the room and in which exists 8 objects, the present invention can track and correlate each object. Assuming that of the 8 objects, 7 include a UWB tag that identifies those 7 objects as authorized entities. The other object either does not possess or tag or the code on the tag is not associated with the authorization list. Each mounted module collects independent sensory information to each object and sensory information relating to each authorized tags. This information is correlated and compared by a central processor to match sensory data with UWB data. Any objects whose location is identified by sensory data but is not correlated with a authorized UWB data can be considered unauthorized. The present invention can thereafter track the unauthorized object, alert authorities with respect to the breach, and/or sound an alarm. And using historical data and predictive algorithms, the present invention can predict the motion of the object.

One or more embodiments of the present invention is operable to continually track entities within a monitored environment. Current technology monitors ingress and egress to secured facilities. Motion detectors and similar technology can identify the presence of an object or motion of an object but not the position of the object. The present invention enables continual monitoring of the position of a plurality of objects within a defined frame or reference. This positional technology can be combined with identity data to determine whether each object within a frame of reference possesses the correct credentials. Alternatively, the present invention can alert individuals within a certain region that an entity has come within the local environment that does not possess the correct credentials.

In the same manner, information tracking of objects can occur passively to acquire other useful data. For instance, in a marketplace equipped with three or more ranging resources, the location and movement of each entity within that marketplace can be tracked. That data alone can indicate which items in the market place are gaining the most interest or, conversely, are gaining interest but not sales. Similarly, if the entity possesses some sort of transmission ability that can provide state information, such as gender, age or other characteristics, the collection of positional data can be further classified. In situations in which an individual can be specifically identified, that individual can be targeted with information based on their actions. For instance if a person seems to be pausing repeated at a counter selling watches, targeted advertisements can be channeled to that individual or household. Recall that the present invention does not rely on GPS or similar technology but can base positional determination from a balance of positional resources.

Another aspect of the present invention is its ability to modify an objects behavior based on a spatial awareness and relative motion of nearby objects. As shown in FIG. 8, the behavior engine 850 is coupled to a control module 870 that initiates commands to a host object resulting in various actions. These commands and actions are also conveyed to the detection module so as to be conveyed, when appropriate, to other objects for predictive purposes. The guarded motion module 830 is also coupled to an alert module which can provide a means by which to alert other objects or a user of a potential conflict. For example, if the object was a cellular phone and based on its motion of the host carrying the cell phone it would have little ability to directly modify the behavior of the user. Yet, the cellular phone or similar device may be able to convey an alert to the user that a conflict has been identified warranting immediate attention. Likewise, the guarded motion module could alert other nearby objects of a conflict it has recognized. While each other object is making similar independent determinations, it is possible that another object's determination of the same conflict may be enhanced by such an alert. The alert module 860 can also present conflict and spatial awareness data to a user terminal that can be merged with other sensor data to provide a user at a control station with an encompassing representation of the environment. In such a mode, a user can modify one or more object's mission objectives or behaviors based on a larger perception of the overall environment and/or strategic goals.

Figure 9:
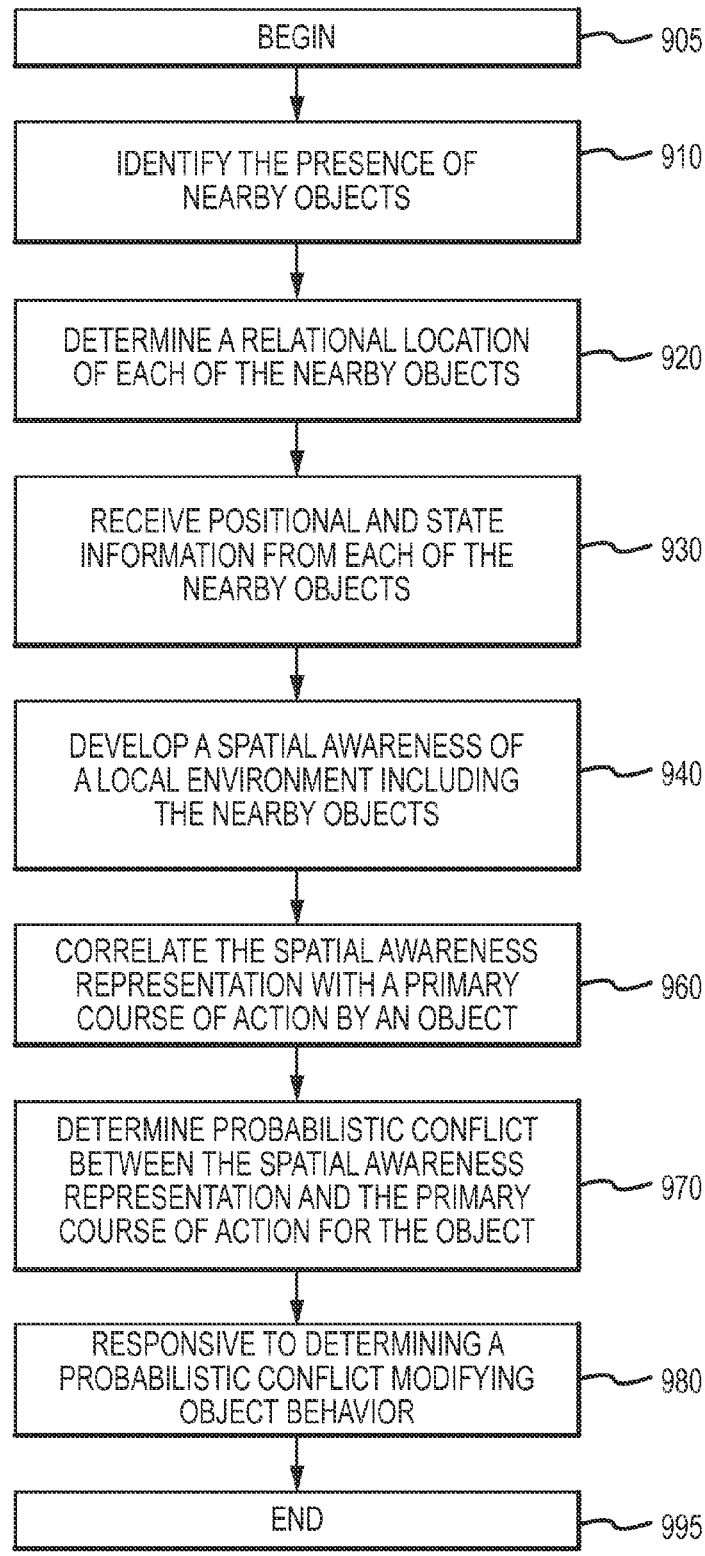
FIG. 9 is a flowchart for one method embodiment for distributed positioning, collaborative behavioral determination and probabilistic conflict resolution according to the present invention.

FIG. 9 is a flowchart for one method embodiment for conflict resolution based on object behavioral determination and, when necessary, collaborative relative positioning according to the present invention. Such a process begins 905 with identifying 910 the presence of nearby objects. Using various techniques as described herein and known to one of reasonable skill in the relevant art, each object senses the presence and relative position of nearby objects. Using this data, a relational location of each nearby object is developed 920. In addition, spatial positional and state information is received 930 from the nearby objects. For example, a host may determine that an object exists bearing 120 degrees relative at 10 meters. That object may thereafter convey to the host object its precise spatial location and motion. Based on this, the host may be able to update its spatial location and determine if their paths are about to cross and conflict.

A spatial awareness of the local environment is thus developed 940 that can include common references as well relational data regarding a plurality of nearby objects. The spatial awareness representation can thereafter be correlated 960 with a primary course of action for an object to determine 970 whether there exists any probabilistic conflicts. Should such conflict exist, the behavior engine can modify 980 the object's behavior to resolve/prevent the conflict. The guarded motion capability of the present invention can be used to coordinate and modify motions such as proceeding to desired spatial location, to follow another object at a prescribed distance or to search/wander a particular region while minimizing interaction with other objects having the same mission objective thereby maximizing ground coverage. The system of the present invention can also be used to track the position of tagged entities and alert a user when those entities enter (or leave) a restricted area. For example, a child leaving the safety of a playground, unauthorized entry into a restricted area region of a work facility. The system can also alert pedestrians and cars alike of pending collisions around a blind corner, warn drivers of an upcoming school zone and even impede an automobiles ability to exceed certain speed limits in that zone.

According to another embodiment of the present invention, an object can include multiple tags or sensors to provide accurate distance and range determination of not only the object but of certain portions of that object. For example, a large vehicle may possess a plurality of tags and antenna orientated so that its orientation and precise location with respect to a hazard or conflict can be determined. In that manner, a user or behavior engine in such a vehicle can determine that a certain portion of the object is in conflict not just the entire object. Consider, for example, a truck backing into a narrow loading dock. The loading dock includes hazard tags marking the obstacles on the dock while the truck includes tags and antenna on each corner of the vehicle As the truck maneuvers into the dock the system of the present invention, it can manipulate the motion of the object to prevent collisions of any particular portion of the vehicle. The present invention applies cognitive skills used by living organisms to mechanical devices. Consider, for example, a person walking down a crowded street in New York City. Using one's senses, the individual collects spatial data regarding is geospatial location but also its relational awareness with respect to other moving objects in its immediate vicinity. The person may have the objective of traveling from point A to B, a total of 4 city blocks. To do so the person may have established a primary route of travel initiated walking down the street. Once on the sidewalk, the individual must quickly assess the motion and position of other individuals, carts, objects on the sidewalk and avoid them. On a typical afternoon, it would be impossible to walk down the sidewalk in a straight line without having to adjust for others traveling nearby.

And as the individual comes to an intersection that person would again use sensory data and ancillary information such as a crosswalk signal to determine if they should venture out into the crosswalk, all the while surveying the local landscape for conflicts. Individuals are very capable of maneuvering a crowded environment, or following another individual without getting too close, or modifying a route of travel if it is determined that the primary route is unavailable. The embodiments of the present invention applies the logic of conflict resolution based on object behavioral determination and collaborative relative positioning to enhance a user's or object's ability to achieve mission objectives while resolving probabilistic conflicts.

One aspect of the present invention is the fusion of sensory data to provide optimal and collaborative positional determination and, when necessary, conflict resolution. It does this not only by using highly precise sensory platforms, but by fusing that data with platforms that provide less ambiguity. For example, early approaches to establish a "following"

behavior were based on the concept that any object should proceed to the reported position of another object. As the first object moves and reports a new position, the object following would modify its course accordingly. Large errors in positional determination and time delays make such an approach unsuccessful. The present invention addresses this and other similar failure by balancing disparate sensory platforms. For example, a less precise GPS positional determination of a nearby object (the target object) can be used to disambiguate among a variety of precise and stable targets that appear ambiguous.

Upon reading this disclosure, those of skill in the art will appreciate still additional alternative structural and functional designs for a system and a process for collaborative spatial positioning through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, all or a portion of the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

An implementation of the present invention may also be executed in a Web environment, where software installation packages are downloaded using a protocol such as the Hyper-Text Transfer Protocol (HTTP) from a Web server to one or more target computers (devices, objects) that are connected through the Internet. Alternatively, an implementation of the present invention may be executing in other non-Web networking environments (using the Internet, a corporate intranet or extranet, or any other network) where software packages are distributed for installation using techniques such as Remote Method Invocation ("RMI") or Common Object Request Broker Architecture ("CORBA"). Configurations for the environment include a client/server network, as well as a multi-tier environment. Furthermore, it may happen that the client and server of a particular installation both reside in the same physical device, in which case a network connection is not required. (Thus, a potential target system being interrogated may be the local device on which an implementation of the present invention is implemented.)

While there have been described above the principles of the present invention in conjunction with a technique for collaborative spatial positioning, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for behavioral determination and conflict resolution by an object, comprising:
    identifying a presence of one or more nearby objects;
    receiving state data from each of the one or more nearby objects wherein state data includes object identification;
    developing a local spatial awareness of an environment including the one or more nearby objects wherein the local spatial awareness includes relative range, bearing and motion of each of the one or more nearby objects and correlates object identification of each of the identified one or more nearby objects with a predetermined authorization list of nearby objects;
    correlating the local spatial awareness of the local environment with a primary course of action of the object;
    determining one or more probabilistic conflicts between the local spatial awareness and the primary course of action of the object; and
    responsive to determining one or more probabilistic conflicts, modifying a behavior of the object.

2. The method for behavioral determination and conflict resolution by an object according to claim 1, wherein modifying including altering the primary course of action to resolve the one or more probabilistic conflicts.

3. The method for behavioral determination and conflict resolution by an object according to claim 1, wherein modifying includes replacing the primary course of action with a secondary course of action to resolve the one or more probabilistic conflicts.

4. The method for behavioral determination and conflict resolution by an object according to claim 1, wherein the primary course of action is associated with a mission objective and modifying includes altering the mission objective to resolve the one or more probabilistic conflicts.

5. The method for behavioral determination and conflict resolution by an object according to claim 1, wherein the one or more probabilistic conflict is determined by a predetermined guarded motion protocol.

6. The method for behavioral determination and conflict resolution by an object according to claim 5, wherein the predetermined guarded motion protocol includes maintaining a minimum safe separation distance between objects.

7. The method for behavioral determination and conflict resolution by an object according to claim 1, wherein the one or more probabilistic conflict is a collision between the object and one or more nearby objects.

8. The method for behavioral determination and conflict resolution by an object according to claim 1, wherein the one or more probabilistic conflict is a collision between the object and a known hazard.

9. The method for behavioral determination and conflict resolution by an object according to claim 1, wherein the local spatial awareness includes range based tracking of each of the one or more nearby objects.

10. The method for behavioral determination and conflict resolution by an object according to claim 1, wherein the presence of one or more nearby objects are determined by interaction of ultra wide band radio frequency identification tags.

11. The method for behavioral determination and conflict resolution by an object according to claim 1, wherein the one or more probabilistic conflict includes identifying an unauthorized presence of one or more nearby objects.

12. The method for behavioral determination and conflict resolution by an object according to claim 1, wherein responsive to determining one or more probabilistic conflicts initiating a user alert system.

13. A system for behavioral determination and conflict resolution by an object, comprising:
    a detection module operable to detect a presence of one or more nearby objects and to receive state data, including object identification, from each of the one or more nearby objects;
    a spatial awareness engine communicatively coupled to the detection module and operable to create a spatial representation of the one or more nearby objects, wherein the spatial representation provides relative positional and translational information about each of the one or more nearby objects and correlates object identification of each of the identified one or more nearby objects with a predetermined authorization list of nearby objects;
    a guarded motion module communicatively coupled to the spatial awareness engine and operable to identify one or more probabilistic conflicts; and
    a behavior engine communicatively coupled to the guarded motion module and operable to modify object behavior in response to the identification of one or more probabilistic conflicts.

14. The system for behavioral determination and conflict resolution by an object according to claim 13, wherein the detection module receives positional information from an active ranging resource.

15. The system for behavioral determination and conflict resolution by an object according to claim 13, wherein the detection module receives collective positional information from the one or more nearby objects.

16. The system for behavioral determination and conflict resolution by an object according to claim 13, wherein the one or more probabilistic conflict exists between the object and the detected one or more nearby objects.

17. The system for behavioral determination and conflict resolution by an object according to claim 13, wherein the guarded motion module includes one or more predetermined guarded motion protocols.

18. The system for behavioral determination and conflict resolution by an object according to claim 14, wherein one or more predetermined guarded motion protocols includes maintaining a minimum separation between objects.

19. The system for behavioral determination and conflict resolution by an object according to claim 13, wherein the one or more probabilistic conflict is a collision between the object and the one or more nearby objects.

20. The system for behavioral determination and conflict resolution by an object according to claim 13, wherein the one or more probabilistic conflict is a collision between the object and a known hazard.

21. The system for behavioral determination and conflict resolution by an object according to claim 13, wherein the one or more probabilistic conflict is detection of an unauthorized object in the spatial representation.

22. The system for behavioral determination and conflict resolution by an object according to claim 13, wherein the behavior is a primary course of action to achieve a mission objective.

23. The system for behavioral determination and conflict resolution by an object according to claim 13, wherein the behavior engine modifies a collective mission objective of the object and at least one of the one or more nearby objects.

24. The system for behavioral determination and conflict resolution by an object according to claim 13, wherein the spatial representation is object centric.

25. A system for conflict identification and resolution, comprising:

a plurality of detection modules each operable to detect a presence of one or more nearby objects wherein each of the plurality of detection modules includes a receiver operable to receive state information from the one or more nearby objects including object identification;
a spatial awareness engine communicatively coupled to each of the plurality of detection modules and operable to create a spatial representation of the one or more nearby objects, wherein the spatial representation provides relative positional and translational information about each of the one or more nearby objects and correlates object identification of each of the identified one or more nearby objects with a predetermined authorization list of nearby objects;
a correlation engine coupled to the spatial awareness engine and operable to correlate relative positional and translational information with received state information;
a guarded motion module communicatively coupled to the spatial awareness engine and the correlation engine operable to identify one or more conflicts; and
a behavior engine communicatively coupled to the guarded motion module and operable to modify a behavior in response to identification of one or more conflicts.

26. The system for conflict identification and resolution according to claim 25, wherein each of the plurality of detection modules is operable to independently collect range information to each of the one or more nearby objects.

27. The system for conflict identification and resolution according to claim 25, wherein state information includes identification data.

28. The system for conflict identification and resolution according to claim 25, wherein the one more conflicts includes non-correlation between objects detected by the plurality of detection modules and received state information.

* * * * *